United States Patent [19]
Fohl

[11] Patent Number: 4,616,878
[45] Date of Patent: Oct. 14, 1986

[54] FITTING FOR A SAFETY BELT FOR MOTOR VEHICLES

[75] Inventor: Artur Fohl, Schorndorf, Fed. Rep. of Germany

[73] Assignee: TRW Repa GmbH, Alfdorf, Fed. Rep. of Germany

[21] Appl. No.: 637,518

[22] Filed: Aug. 3, 1984

[30] Foreign Application Priority Data

Aug. 4, 1983 [DE] Fed. Rep. of Germany ....... 3328258

[51] Int. Cl.⁴ .............................................. B60R 21/10
[52] U.S. Cl. .................................... 297/483; 297/468
[58] Field of Search ................ 297/483, 468; 280/801, 280/808

[56] References Cited

U.S. PATENT DOCUMENTS 4,470,618 9/1984 Ono ..................................... 280/808
4,508,363 4/1985 Temple .......................... 297/483 X

FOREIGN PATENT DOCUMENTS 2081568 2/1982 United Kingdom ................ 280/808

Primary Examiner—James T. McCall
Attorney, Agent, or Firm—Yount & Tarolli

[57] ABSTRACT

An adjustable safety belt anchorage is disclosed which includes a guiding rail adapted to be mounted in a motor vehicle, a carriage longitudinally slidable in first and second directions along the guiding rail, the guiding rail having longitudinally spaced locking openings, a locking member movably mounted on the carriage for selective engagement with the spaced locking openings, the carriage having support means for the safety belt, an actuator member movable relative to the carriage for a limited distance in the first and second directions, mechanism for converting relative movement between the actuator member and the carriage in a selected one of the first and second directions into movement of the locking member away from one of the locking openings, and the actuator member and carriage being interconnected for moving the carriage along the guiding rail in the selected one of the first and second directions in response to continued movement of the actuator member in the selected one of the first and second directions.

19 Claims, 23 Drawing Figures

FIG. 6
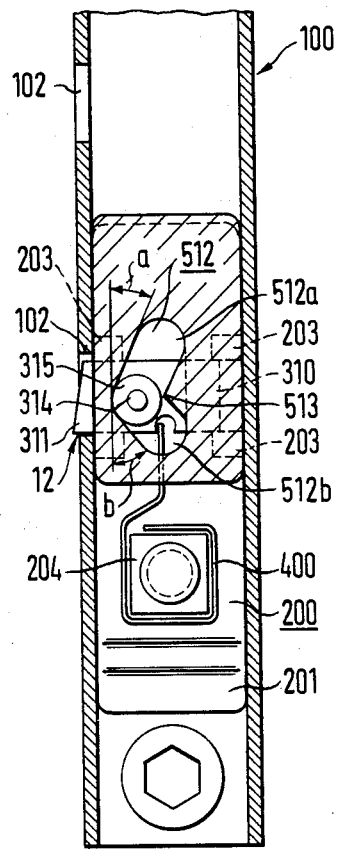
FIG. 7
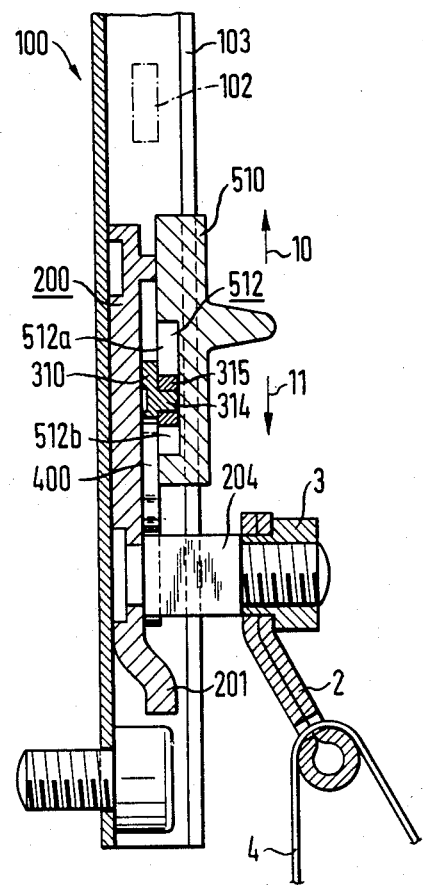
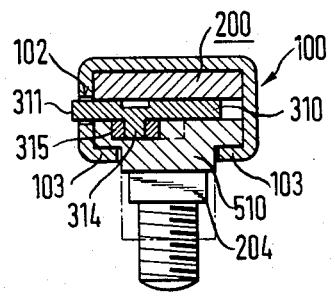
FIG. 8

FITTING FOR A SAFETY BELT FOR MOTOR VEHICLES

The invention relates to an adjustable fitting for a safety belt for motor vehicles.

In safety belt systems for motor vehicles it is known to be able to adjust in height, according to the size of the vehicle passenger to be secured, a support point provided for the belt band, for example, in the form of a turning fitting. To obtain an ideal protection for the vehicle passenger, it is necessary to place or adjust the support point downward for smaller persons and upward for larger persons. Devices which serve this purpose are known in the greatest variety of designs. They consist mainly of a guide rail part, joined rigidly with the vehicle, in which is guided a slide part, movable lengthwise and which can be fixed in place, to which, for example, the turning fitting is fastened. The actuation of these known devices consists always of two courses of movement, such as, for example, swinging and pushing, pressure and pushing, drawing out and pushing, and the like.

Through the solution according to the invention, the advantage is given that, with a single movement process, namely, a pushing movement in the particular desired direction of adjustment, first there takes place an unlocking of the movable fitting part, then the pushing into the desired height position, and finally also the new fixing in this height position. The whole process, that is, the unlocking, the moving along, and the relocking takes place, therefore, during the pushing of the slide in only one direction, and namely in the desired direction of movement. In this way it is possible, by placing on the slide arrows pointing in different directions, to make clear to any user, at once and unequivocally, the operation of the fitting according to the invention, since a movement other than the pushing along movement is no longer necessary.

Preferably there is fastened to the fitting part, below the catch a slide, a threaded peg to which, in turn, a turning element, for example, may be fastened. This threaded peg or fitting peg in general, serves at the same time as opposite support for a spring, through which the catch, movable in the transverse direction, is pressed into the locking position.

In one embodiment of the invention, the advantage is given that through the presence of the run-up diagonal on the catch, cooperating with the guide bar, the adjusting elements need exert only a small lift on the catch, and the remaining lift takes place through the run-up diagonal. In another embodiment of the invention the presence of two catches, acting in opposite directions of adjustment, the advantage is given that, with opposite positions of the run-up diagonals, only one catch need be actuated in each case through the adjusting elements, while the other catch carries out automatically, through the run-up diagonal, the unlocking lift.

After the release of the slide, that is, after the pushing process itself, the slide returns automatically to a zero position. With the presence of control curves as adjusting elements, the advantage is given from this that, with proper curve guiding of the slide into the zero position, a forced locking of the catch or catches provided with the corresponding control sets, can be obtained, so that even with extreme shocks on the vehicle, a movement of the catch out of the locked positions is not to be feared.

The adjusting elements which effect a turning of the pushing force into the particular transverse direction, may be designed in various ways; for example, in the form of a cam gear or in the form of a curve gear.

In one embodiment of the invention, an adjusting element is a cam disc, which is supported freely rotatable on the fitting part, and which cooperates with sets of cams on the slide.

Since a downward directed force always engages against the height-adjustable fitting and indeed against the peg of the fitting, through the return force of the belt, the adjusting forces, for height adjustment of the fitting, and the opening forces, downward and upward, are very different. Through the further development of the invention, this problem is taken into account. Here, by corresponding angle inclination of the curve section of the control curve, in pushing the fitting upward, the support pressure is correspondingly reduced with the greater curve angle, as compared with the angle of the curve section for the downward movement, since with the downward movement, the return pressure caused by the wind-up mechanism, is added also the pushing pressure. Through proper dimensioning of the curve angle, conversions can be given very simply, so that also with movement downward, an easy release of the catch from the locking position is possible.

Through the further development of the invention it is advantageously achieved that particularly with the pushing upward of the fitting and the slide, even with extremely rapid pushing of the slide, it is in no case possible to run past the next catch opening; that is, it is assured that the catch automatically falls into the next catch opening.

In an especially advantageous way, there is carried out here, with a special catch, which can be pushed crosswise, a pre-locking into the next catch opening, through which the catch itself is situated with certainty in the predetermined catch height position on the guide bar, so that it can be caught, without obstruction and with certainty, into the corresponding catch opening. The pre-locking catch, with the automatic return of the slide into the zero position, is moved out of the zone of the respective catch opening.

In one preferred solution, an advantageous combination of height-adjustable fitting parts with a clamping device is proposed. Here, the guide bar, guiding the fitting part, is supported, in turn in a stationary guide bar, and movable therein, limited by a stop. With the action of an extreme pulling force on the safety belt, thus, in an accident, the first guide bar is pushed downward and actuates automatically the clamping device for the belt band, which is clamped and stopped at this place immediately, so that no further pull on the belt band from the wind-up automat is any longer possible.

It is possible, advantageously, to cover all the said fitting parts, through a covering, guided movable in the vehicle lining, which is coupled with the slide.

Other advantageous details of the invention are given from the examples of execution, represented in the drawings and described below.

FIGS. 6 to 9 show a second embodiment of the invention in three sectional views and in a exploded representation.

FIGS. 18 to 20a and 20b show the combination of the saftey belt adjusting apparatus according to the preceding figures, with a belt band clamping device, in top view, side sectional view and in two other sectional views, which show alternative forms of execution of the guide bar.

Figure 1:
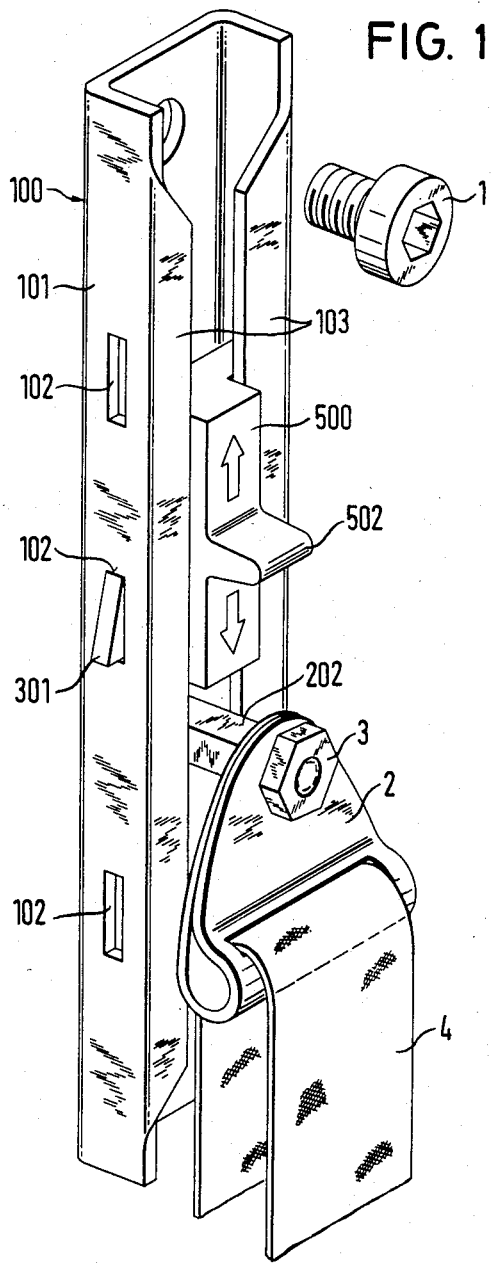
FIGS 1 to 5 show a first embodiment of the invention, in perspective, in sectional views and in an exploded representation.
Figure 2:
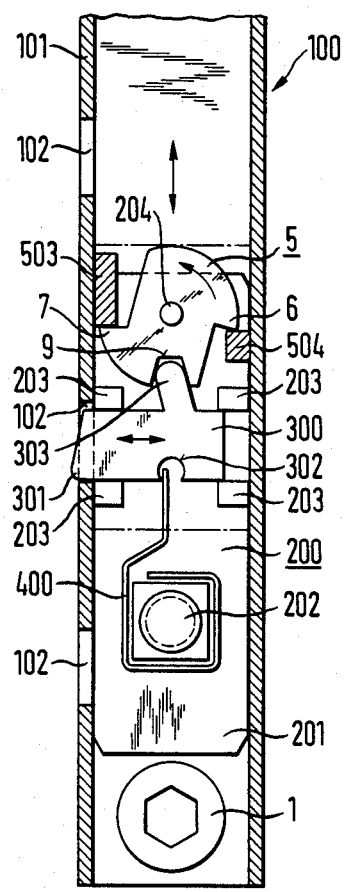
Figure 3:
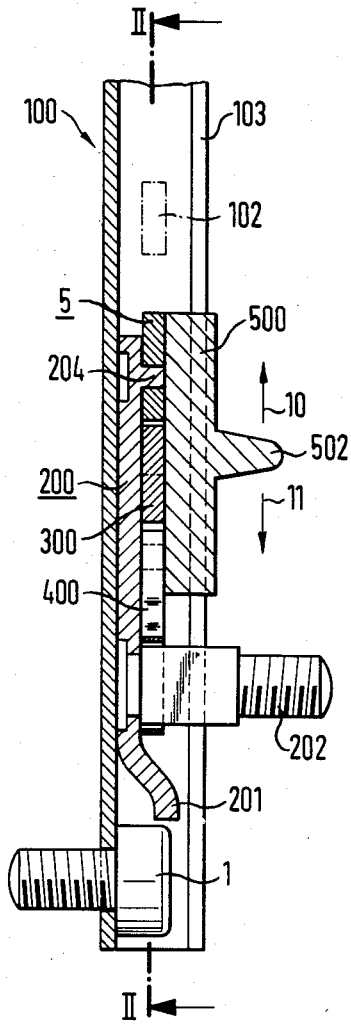
Figure 4:
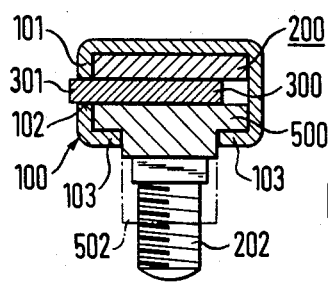
Figure 5:
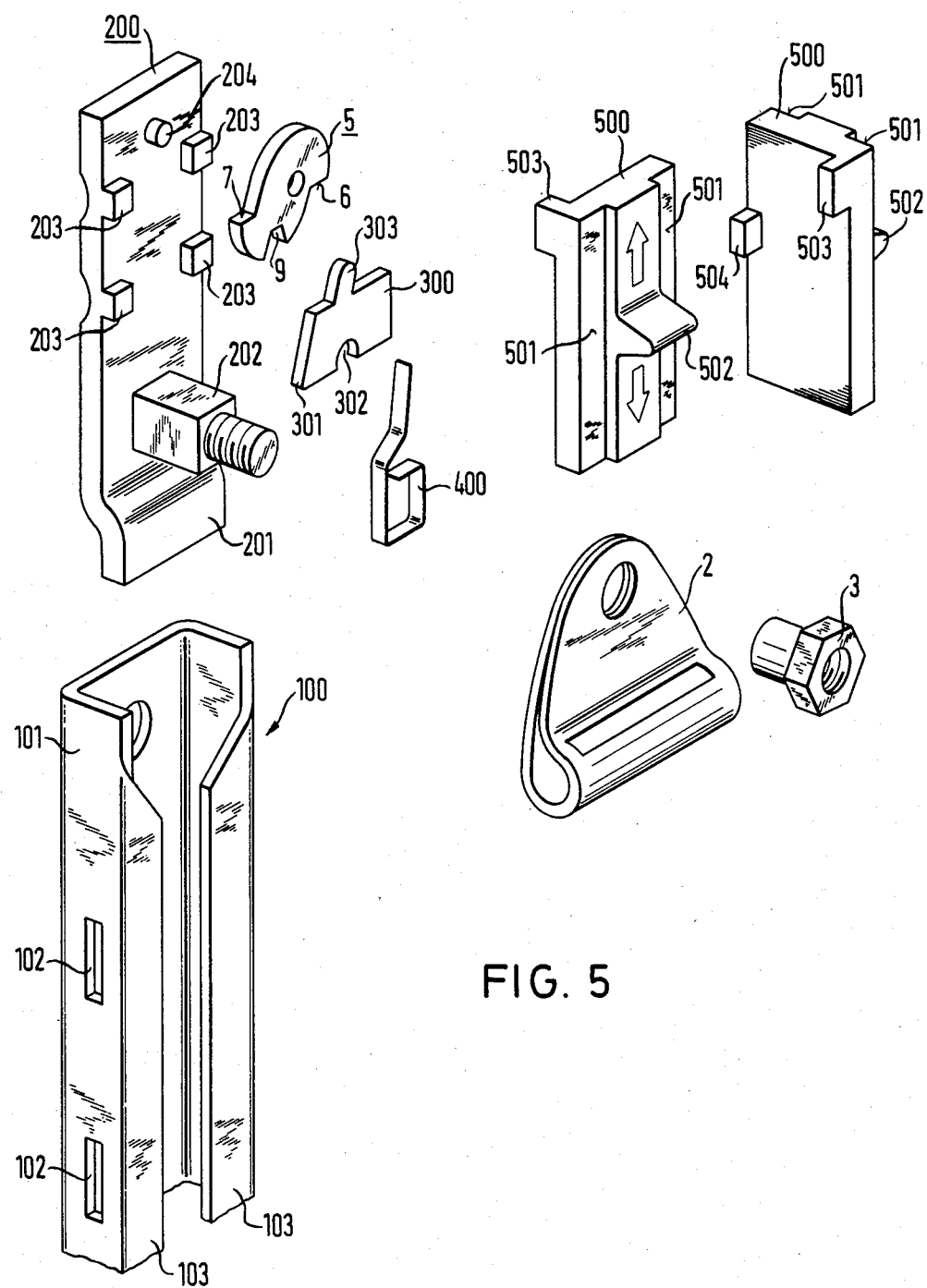
Figure 9:
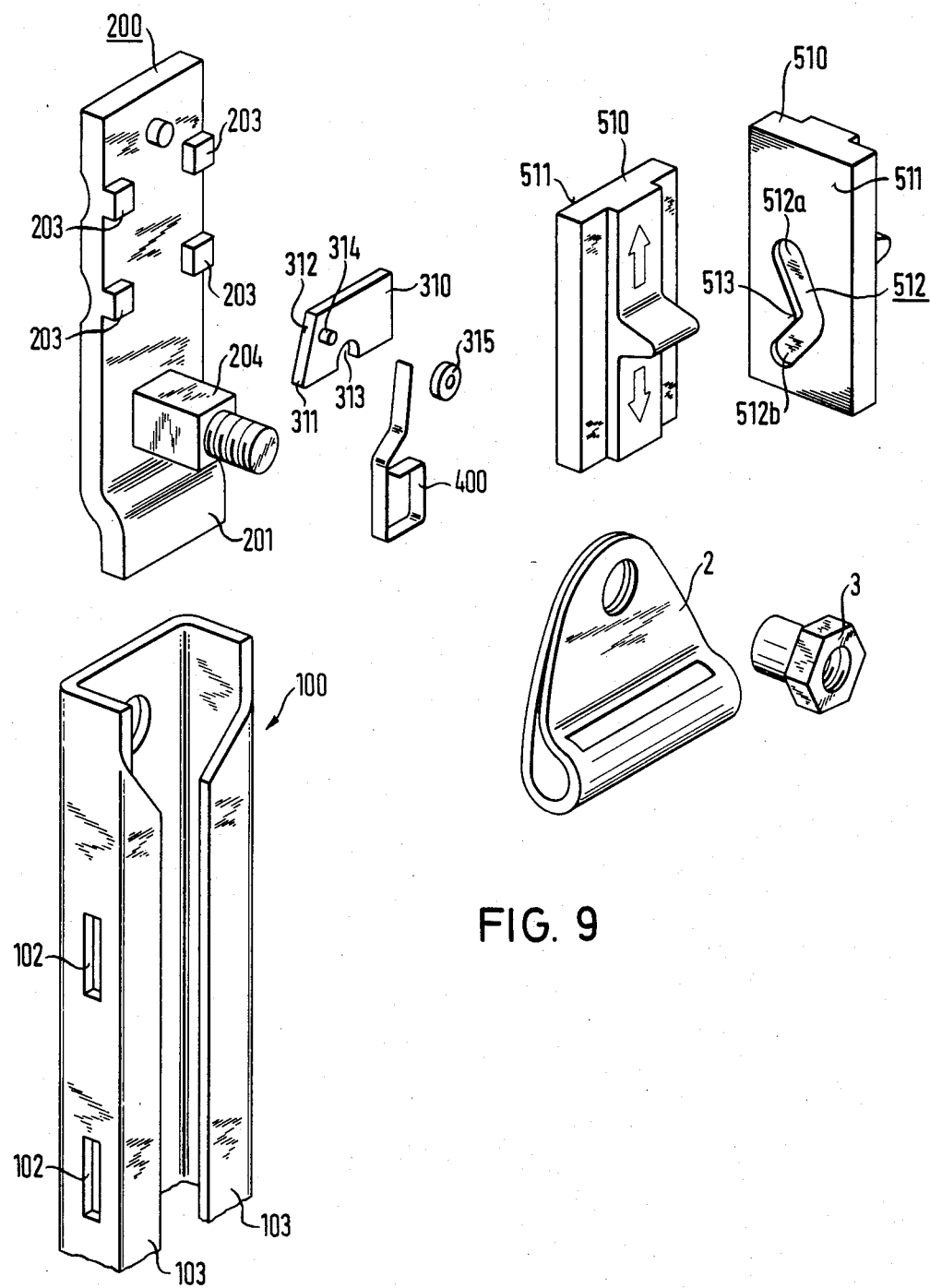

In the example of the adjustable seat belt anchorage according to FIGS. 1 to 5, as support for the fitting described below, a C-shaped elongated guide bar or track 100 is provided, which can be fastened in vertical arrangement, by means of a screw 1, for example, on the middle pillar of a motor vehicle. This guide bar 100 has, on a flank 101, bent to the side, rectangular catch openings 102, lying distanced from each other. Inside this guide bar (rail) 100, guided movable lengthwise, is an elongated, plate-like or carriage 200, which has at the lower end a bend 201, by which the fitting part 200 is guided on the flaps 103, bent in C-shape. Near this bend 201, and also at the lower end of the fitting part 200, is a threaded peg or connector 202, with square base part, and with a threaded addition, to which can be fastened, by means of a screw nut 3, a turning fitting 2, in the form of a metal sheet bent substantially in U-shape. The turning fitting 2 serves for the turning of a safety belt band 4, coming from an automatic wind-up (not shown), which band from here, is conducted around the body of the vehicle passenger to be secured, and can be stopped against a stop fitting rigid with the housing. The fitting part 200 has a tunnel-like stamped-out bearing additions 203, which serve to guide a plate-like catch or locking member 300. This catch 300 has a saw-tooth catch end 301, a coupling groove 302 and a carrier addition 303 on the opposite side. This catch 300 can be pushed, in the arrow direction according to FIG. 2, transverse to the path of movement of the fitting part 200 in the bearing additions 203, into a locked position shown in FIGS. 2 and 4, in which the toothed catch end 301 projects into the catch opening 102 and into a postion outside this catch opening. 400 is a form spring, consisting of flat material, which is supported, by a square shaping, secured against rotation, on the square base part of the threaded peg. By the free end, it engages in the coupling groove 302 of the catch 300, and with this, presses the catch 300 into the locking position. Supported freely rotatable on a bearing peg (journal) 204 of the fitting part 200, is a cam or operator wheel 5, which at places diametrically opposite has tooth-like control cams 6 and 7, and is provided between (them) with a carrier groove 9, in which the carrier addition 303 of the catch 300 engages. On the guide bar (rail) 100, also supported movable in the pushing direction, is a slide or actuator member 500, which is supported by guide paths 501 on the flaps 103 of the guide bar 100, and which has a handle 502. As shown especially in FIG. 5, the slide 500 has, on the surfaces turned toward the guide bar 100 and the fitting part 200, at different heights, two cam additions 503 and 504, which are shown in detail in FIG. 2, loosened from the slide 500. These cam additions 503 and 504 are directly coordinated with the control cams 6 and 7 of the cam wheel 5, and lie in their path of movement. With manual actuation of the slide 500 in the pushing direction 10 (FIG. 3), the cam addition 504 presses the control cam 6 upward, and the cam wheel 5 rotates in the arrow direction. With this, the catch 300 is moved inward, out of the locked position. Now the fitting part or carriage 200 is released in the direction of movement and can be pushed to the next catch opening 102. The carriage 200 is pushed by force transmitted from the cam addition 504 on the side 500 to the cam wheel 5 and from the cam wheel to the bearing peg 204. When the described higher catch opening 102 is reached, the handle 502, is released and the catch or locking member 300 moves into the desired catch opening 102. If the slide 500 is pushed downward in the pushing direction 11, then by the attack of the cam addition 503 against the control cam 7 of the cam wheel 5, this cam wheel is swung in the same way, in the arrow direction, so that again the catch 300 is retracted to from the locked position. Here also, through the slide 500, the fitting part or carriage 200 can be manually pushed to the next lower catch opening 102, where again the catch 300 is pressed by the spring 400 into the locked position. For easy understanding of the operation, the slide 500 is marked with arrows on both sides of the handle 502.

While in the example of execution described above, the adjusting elements for turning the pushing force in a direction perpendicular to same, are designed as cam gears, these adjusting elements, in the example of execution which follows, as in the example of execution according to FIGS. 6 to 9, are parts of a curve gear. In this example of execution. In this example of execution, the guide bar or track 100 and fitting part or carriage 200 correspond to those of the Example of FIGS. 1 to 5. Between the bearing parts 203 of the fitting part 200, is supported again a catch or locking member 310, movable transversally, which is provided, as in the preceding example, with a beveled catch end 311, with run-up (transition) bevels 312, and also has a coupling groove 313, in which engages the free end of the spring 400. The catch 310, is also provided with a peg-like control addition 314, on which is supported freely rotatable, a control roller or cam follower 315. Also, in this example of execution, the actuator slide 510 is designed like that in the previous example, except that on the surface 511 of the adjusting element, turned toward the fitting part 200, a V-shaped control curve or cam 512 is provided; that is, cut or milled in this surface. After mounting, the control roller 315 of the catch 310 engages in this control curve 512 and is forcibly guided therein. The control curve 512 has a first curve or operator section 512a, inclined diagonally to the upward pushing direction, and a second curve or operator section 512b, inclined diagonally to the downward pushing direction. On pushing the slide 510 in the pushing direction 10 or 11, the control roller 315 runs up on the first-mentioned curve section, with which the catch or locking member 310 is retracted, against the force of the spring 400, from the locking position, so that the slide 510, together with the fitting part or carriage 200 can be pushed into the desired height position, up to the next following catch opening 102. During pushing of the slide 510 with the catch or locking member 310 in the release condition, force is transmitted from the end of a cam surface section 512a or 512b to the cam follower 315 and catch or lock member 310. The force is transmitted from the catch or lock member 310 to the fitting part of darriage 200. By pushing the slide 510 in the pushing direction 10, thus upward, the contact pressures at the point 12 of the catch 310 is removed; therefore the angle b can be kept greater than the angle a of the curve section, since here, in addition to the retraction pressure (wind-up automat), there is also the pushing pressure. By reducing the angle a, a corresponding conversion can be created here, so that also with movement downward (pushing direction 11) an easy loosening is possible. In the zero and locking position according to FIG. 6, the curve cam (hump) 513, between the two curve sections, is at the height of the control roller 315, so that the latter, and with it the catch 310, are forcibly stopped, so that, for example, the acceleration force occurring in a driving accident need not be applied through the formed spring 400. With proper dimensioning of this spring 400, the force stopping against the hump 513 might be eliminated.

Figure 10:
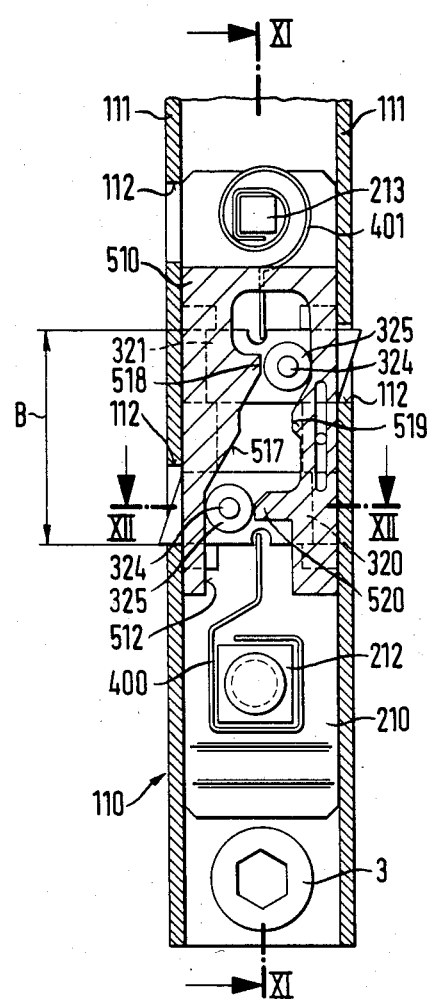
FIGS. 10 to 13 show a third embodiment of the invention in three sectional views and in an exploded representation.
Figure 11:
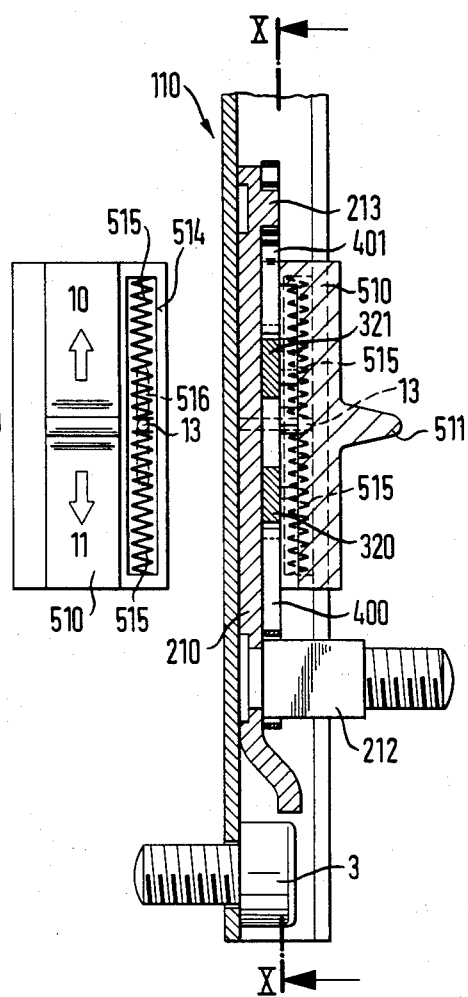
Figure 12:
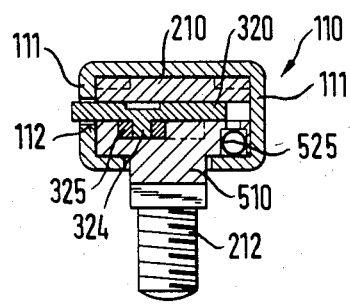
Figure 13:
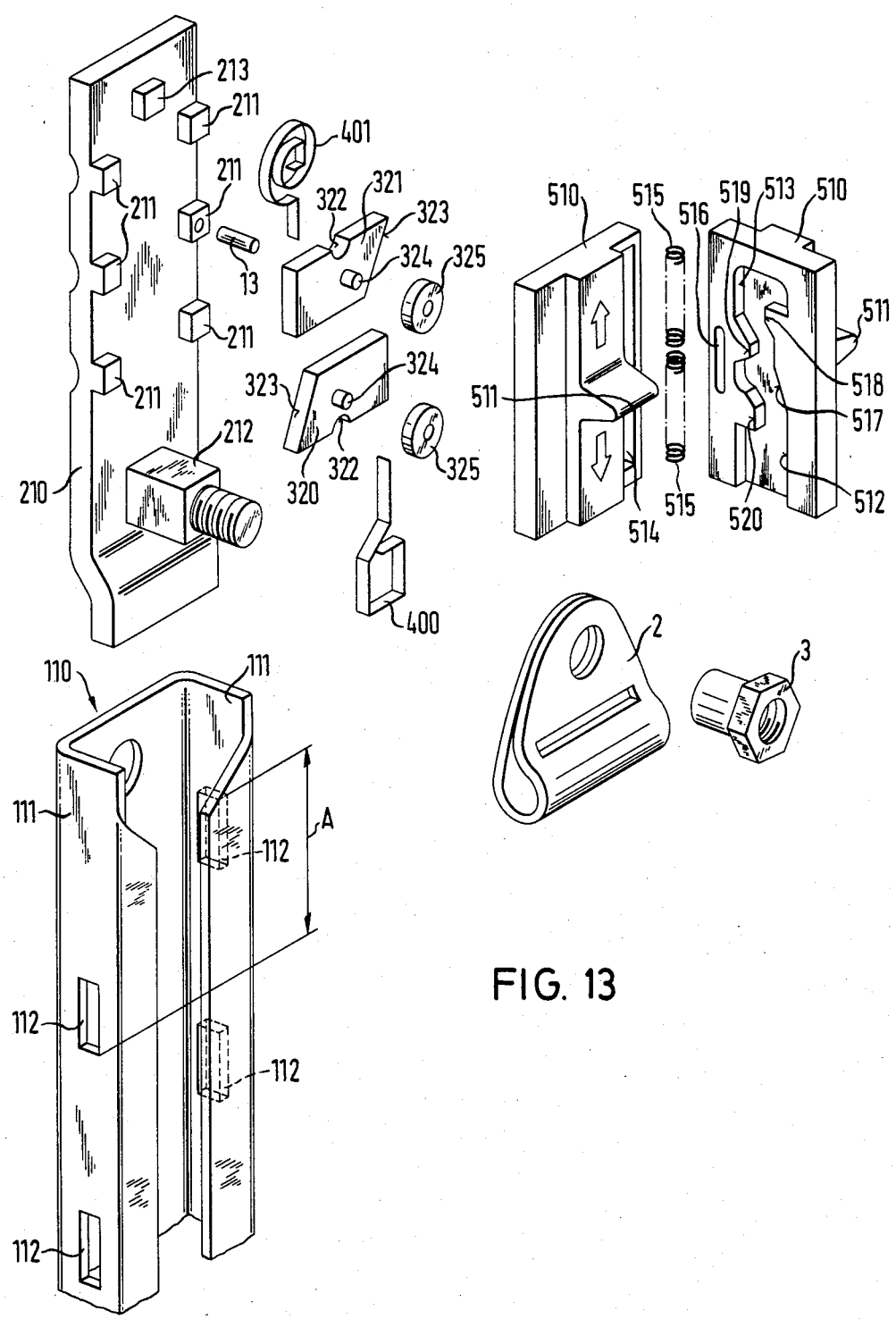

In the example of execution according to FIGS. 10 to 11, again, a C-shaped guide bar or track 110 is provided, which has catch openings 112 on both sides 111, at a distance A, in the pushing direction (FIG. 13), which is greater, by one clearance (amount of play) than the distance B (FIG. 10) of the outermost edge, in each case, of the catch ends of the two catches, 320 and 321, described below. For these catches or locking members, again on a plate-like fitting part or carriage 210, tunnel-like bearing parts 211 for the two catches are present, in which the two catches are guided, movable transversally. In the zone of the lower end of the fitting part 210 is again a threaded peg 212 for a formed spring 400, and at the opposite end of the fitting part 120 is another square bearing peg 213, of the spring 401, similar to the spring 400. Both springs, 400 and 401 engage by their free spring ends, again, in the coupling grooves 322 of the catches 320 and 321, which also have strongly beveled run-up (transition) or operator surfaces 323. The two catches have, again, control additions 324 for the control roller or cam follower 325. For example, the catches and the control rollers are designed identically. 510 is again a slide or actuator member, provided with a handle, which slide, on the bounding surface toward the fitting part 210, is provided with two control curves or cam surfaces 512 and 513. The control curves 512 cooperates with and operates the catch 320 and the control curve 513 cooperates with and operates the catch 321, as will be described below. At the outer side limit of the handle 511, the slide 510 has an elongated groove 514, in which lie two spiral springs 515. These spiral springs 515 are supported, in each case, against the limits of the groove 514 and are joined, in the middle, with a peg (journal) or force transmitting member 13, which is fastened in one of the bearing parts 211 on the carriage 210. This peg 13 projects through an elongated hole 516 on the back of the slide 510, into the groove 514, and is connected with the spiral springs 515. The springs 515 are set-back springs, which after the release of the slide 510, pushed along in relation to the fitting part 210, return it to a predetermined zero position in relation to the fitting part. As FIGS. 13 and 10 show, the control or operator curve 512 has a curve section 517, diagonal to the pushing directions 10, 11, as well as a curve hump 518. The control or operator curve 513, lying opposite has also, at the height of the control hump 518 a control or operator cam 519 with diagonal run-up (transition) surfaces, and in the level of the base zone of the control section 517 another control cam 520. In this example of execution, the catches 320 and 321 project into the locking and caught position only by the beveled catch ends, that is, with the run-up (transition) surfaces 323 in the catch openings 112 of the guide bar, so that after the force unlocking (uncatching) of the one catch, the other catch, solely by the running up of the run-up surface 323 on the limit edge of the catch opening 112 is brought out of catch engagement. If the slide 510 is pushed downward in the pushing direction 11, the cam follower 325 on the catch 320 is brought into engagement with the diagonal curve section 517. Continued downward movement of the actuator slide 510 causes the cam surface 517 to operate the catch 320 to the release condition in which it is out of engagement with the catch opening 112. At the same time, as described before, the catch 321 is also pushed out of engagement with an opening 112 by a cam or operator surface 323 on the catch. The carriage 210 is moved by force transmitted from the actuator slide 510 by engagement of the pin 13 with the end of the slot 516. On reaching the next catch opening 112, a renewed locking takes place automatically, first by the spring biased catch 321, and then, after releasing the slide and returning same to the zero position, by the catch 320 also. By pushing the slide 510 in the opposite direction, that is, in the upward pushing direction 10, the cam or operator curve 519 presses the catch or locking member 321 so far back over the control roller 325, that the catch 321 comes out of engagement with the catch opening 112. The catch 320 is again automatically brought out of engagement through its run-up or operator surface 323. Now the actuator slide 510, together with the fitting part 210, can be pushed upward into the next height position by force transmitted from the actuator slide 510 to the carriage 210 by the pin 13. Through this upward pushing movement, the cam curve 519 now lies against the control roller 225 of the catch 321. On reaching the next catch opening 112, the catch 320 is pressed, with lightning speed, under the force of the spring 400, into the corresponding catch opening 112. As mentioned, between the successive catch openings 112 on both sides of the guide bar 110, such a clearance distance is present that, on stopping, the pushed parts, the lower catch 320 can fall very easily into the catch opening 112. Now if the handle 511 is released, the said clearance distance is removed as a result of the retraction force of the safety belt wind-up system, and this clearance is formed at the upper catch 321. Through the springs 515, after the release of the handle 511, the slide 510 is set back into the zero position. Through the cam curve 519, the upper catch 321 is slightly retracted, to fall back immediately into its catch position, under the force of the spring 401. In this way it is assured that in both pushing directions, the device is caught into the next catch opening each time.

Through the embodiment according to FIGS. 14 to 17, it is assured that even with extremely jerky pushing, especially with pushing up and nonrelease of the handle, it is no longer possible to run past a catch opening. In this example of execution, the guide bar or track 110 corresponds to the guide bar according to the preceding example of execution. The fitting part or carriage 210 also corresponds mainly to the fitting part according to the preceding figures, except the bearing peg 213, according to these preceding figures is absent, and instead of a single force transmitting peg (13), arranged in the middle, two force transmitting pegs 14 are provided, which are arranged in the zone of the outer limits of the paths of movement for the catches described below.

These two pegs 14 are components of a zero position set-back device, formed, for the rest of a single long-stretched spiral spring 531 of a slide 538, which is arranged in an elongated groove 532, into which zone the pegs 14 project through elongated hole-type windows 533. The two ends of the spiral spring 531 cooperated directly with the ends of the pegs 14, so that with the pushing of the slide 530 in relation to the fitting part or carriage 210, the spiral spring 531, through the pegs 14, seeks, after release of the actuator slide 530, to set it back again into the predetermined zero position. In the example of execution, the actuator slide 530 consists, for the rest, of two parts, namely, a base part 534 and a plate-like handle part 535, which has the handle 536. Between the bearing parts 211 of the fitting part 210, guided movable transversal, is a first catch or locking member 330 and, above this, a second catch 331. The catch or locking member 330 has a control part 332 for a control roller or cam follower 225 and the catch end, turned toward a second control part 333 in the form of a peg. This catch has, again, a run-up (transition) diagonal 338 and an outer catch edge 335, on the one hand, and another second catch edge, 336, lying inside, on the other. The upper catch 331 has also a control part 337, as well as a run-up diagonal or operator surface 338 and a catch edge 339. The slide 520, which consists, as explained, of two parts 534 and 536, fastened together by gluing, clipping, or the like, has on the flat surface, turned toward the fitting part 210, several control curves, and namely, a first operator curve 537, which is assigned to the control part 332, with control roller 225 of the catch 330, a second control or operator curve 538, which is assigned to the control part 337 of the catch or locking member 331, as well as a third, substantially L-shaped control curve 539, which is assigned to the control part 333 of the catch 330. This last control curve 539 has a control edge 540. The control curve 538 runs substantially in the pushing direction and has a curve section 541 inclined toward the assigned catch opening 537. The first control curve 537 runs substantially in a straight line in the pushing direction and has a curve hump (cam) 542, with diagonal run-up (transition) surfaces.

Figure 14:
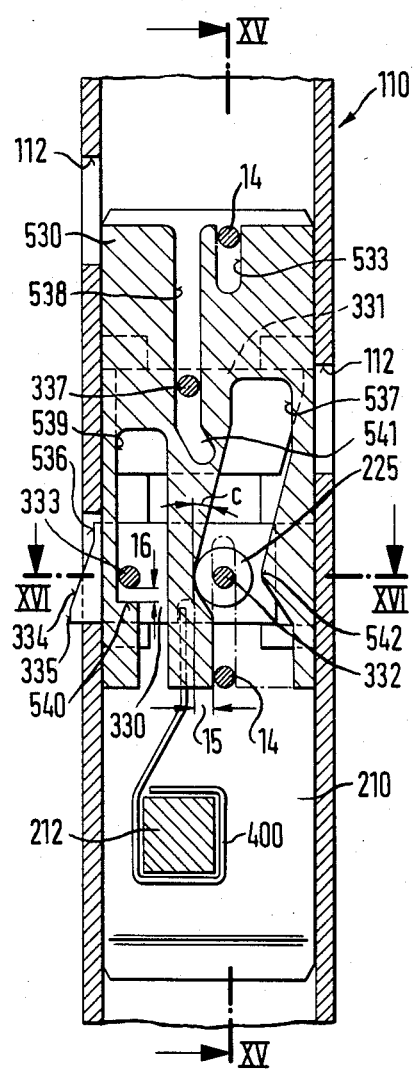
FIGS. 14 to 17 show a fourth embodiment of the invention, again in three sectional views and in an exploded representation.
Figure 15:
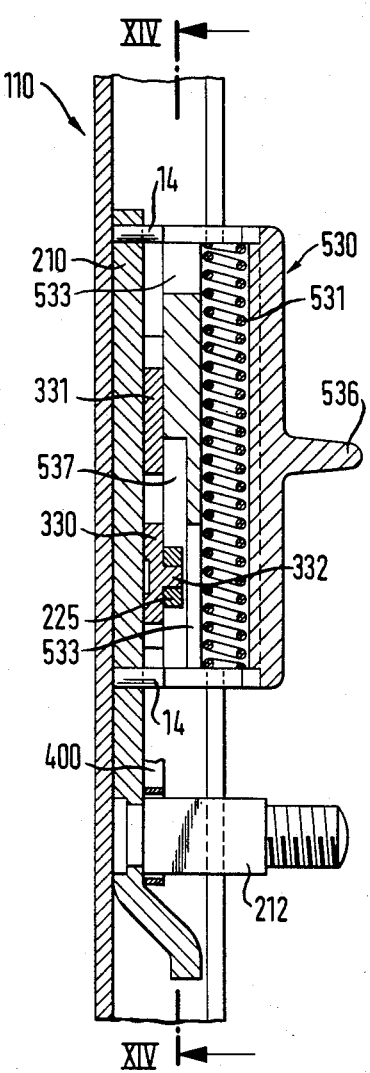
Figure 16:
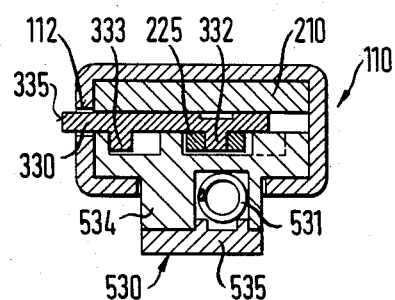
Figure 17:
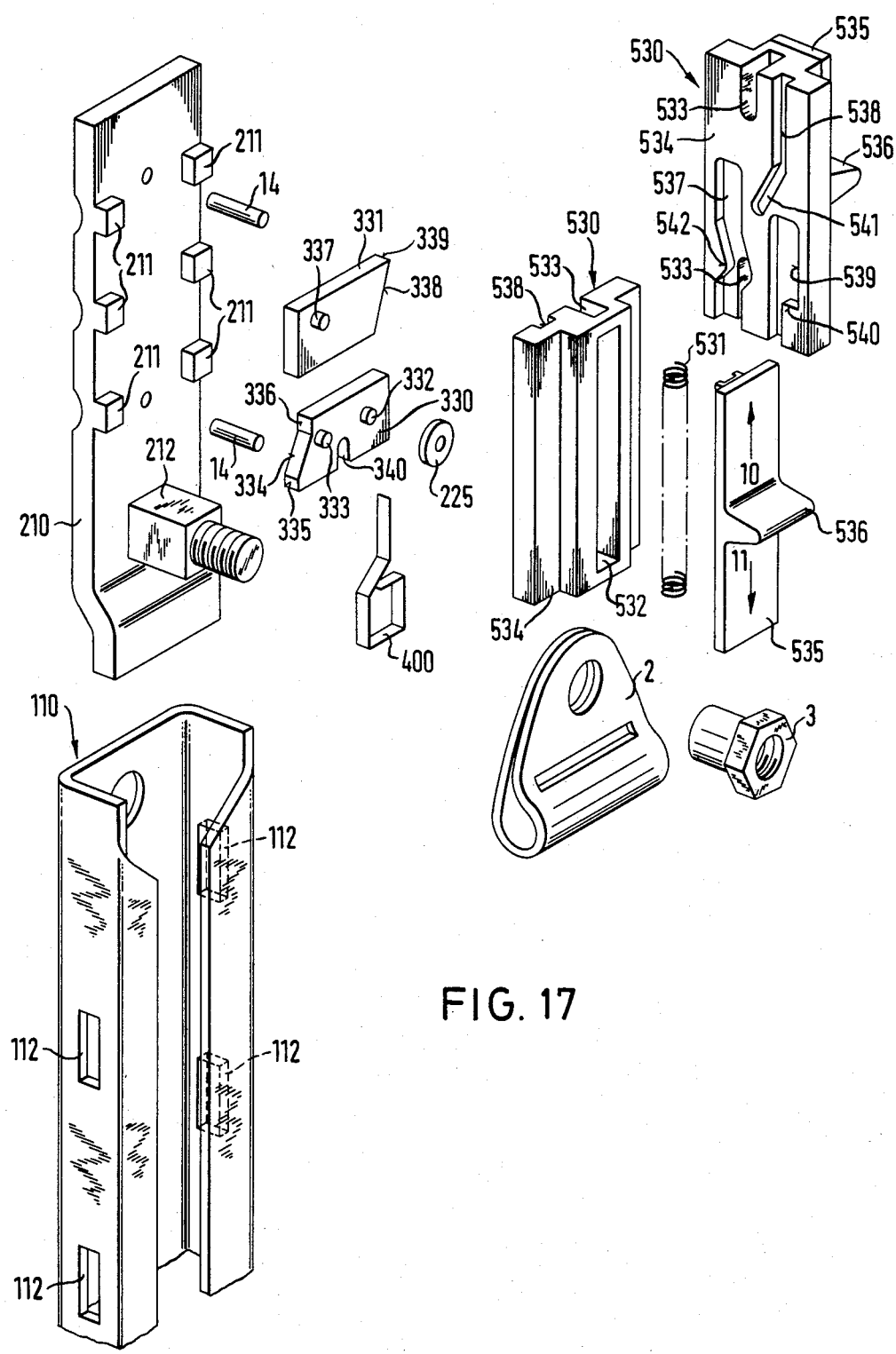
Figure 18:
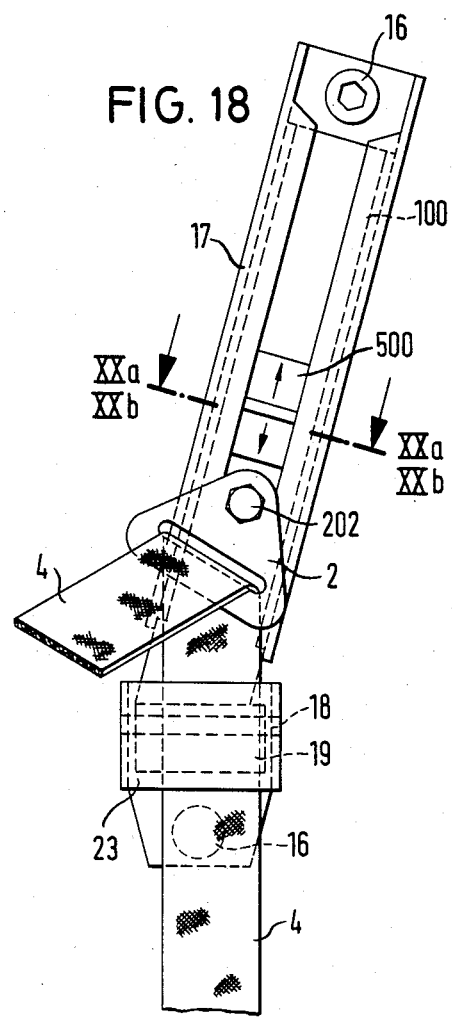

The lower catch or locking member 330 has, again, a carrier groove 340, in which engages the free end of the form spring 400, and presses the catch 330 into the locking position. As shown particularly in FIG. 14, this catch position is determined by stops of the control part 333 of the catch 330, on the curve section of the control curve 539 which runs in the pushing direction. Here, the catch end of the catch 330 dips only so far into the catch opening 112 that the two catch edges 335 and 336 are within the catch opening. In this catch position, the catch 330 is forcibly stopped by the curve cam 542, arranged at the level of the control roller 225 in the zero position of the slide 530. In this locking or zero position, the upper catch 331, by its control part 337, is situated in the curve section of the control curve 538 running in a straight line, and is thus conducted forcibly outside the catch opening 112. Also, in this example of execution, the distance of the outermost edges, in each case, of the two catch openings for the two catches, is greater by one clearance than the distance of the outermost catch edges 335, 339 of the two catches 330, 331, from each other. As mentioned, FIG. 14 represents the locking position of the device. Here, the catch end engages, by the catch edges 335 and 336 in the catch opening 112, which must be great enough so that, forces occurring in an accident can be absorbed in both directions. Here, the catch 331 lies within the side walls of the guide bar 110. With pushing of the slide 530 downward in the direction 11, the catch 330, through the control roller 225, will be set, by the angle c, out of engagement with the catch opening 112. Since at the threaded peg 212, because of the retraction force of the belt wind-up, there is always a force in the direction 11, a secure unlocking is assured. In pushing downward, the unlocking process is supported by the action of the spiral spring 531. In pushing the slide 530 upward, in the pushing direction 10, the catch 330 is retracted through the control roller 225 by the measure 15. This measure 15 is somewhat greater than that by which the catch edge 336 engages in the catch opening 112, so that, with further pushing, the control part 333 comes to lie against the catch edge 540 of the slide 530. The control part 333 now lies against the catch edge 540 until it is detoured inward by the run-up surface 334 on the catch 330, and arrives in the zone of the curve section, running in the pushing direction, of the control curve 539. The distance 16 is so great that the catch edge 339 of the catch 331 has run past the catch opening 112. After the control part 333 lies in the zone of the straight-line section of the control curve 539, the slide 530 is pushed farther upward and the stamped control part 337 of the catch 331 comes into the zone of the diagonal curve section 541 of the control curve 539. With this, the catch edge 339 of the catch 331 slides on the inner wall of the guide bar 110. By pushing the slide 530 farther in the direction 10, at the next catch opening 112, the catch 331 is controlled outward; that is, this catch is locked into the catch opening, so that the pushing path upward is limited. With this, a pre-locking of the system has taken place in a position in which the catch 330 situated, with certainty, at the height of the desired catch opening 112. With release of the slide 530, the catch 331 is again retracted through the spiral spring 531, and also, the lower catch 330 is brought into full engagement in the catch opening 112.

Figure 19:
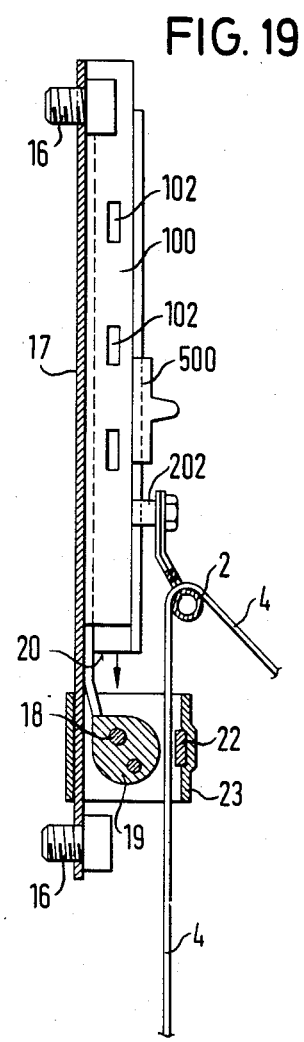
Figure 20A:
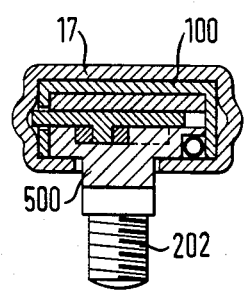
Figure 20B:
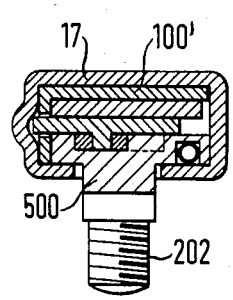

In the example of execution according to FIGS. 18 to 20b, a fitting according to the preceding examples of execution, with guide bar 100 with catch openings 102 and slide 500 is guided movable lengthwise within another guide bar 17. This guide bar is solid with the vehicle by means of screws 18, for example, connected with the middlestay (stringer) of the motor vehicle. The latter guide bar 17 is also designed in C-shape. According to FIG. 20a, the movable guide bar 100 is U-shaped, while in the example according to FIG. 20b, this guide bar is designed L-shaped in cross section, unlike the preceding examples of execution, in which the guide bar is always designed C-shaped. With the last mentioned guide bar 100 or 100' is rigidly joined the threaded peg 202 for the swingable stopping of the turning fitting 2 for the belt band. The pushing distance of the guide bar 100 or 100' downward, thus in the pulling direction of the belt band 4, is limited by a stop. This stop consists of a clamping element 19, supported eccentric at 18, substantially drop-form, which is swung, through run-up (transitions) of the lower limit 20 of the guide bar 100 or 100', around the turning point 18, in the direction of a stationary clamping surface 22, which is a component of a strap 23, and which may have a coating with a high friction coefficient, as shown in FIG. 19. In normal operation, the belt band 4 runs unhindered and without contact between clamping element and clamping surface 22 and can be wound off and on normally and without force. With an extreme pull on the belt band 4, the guide bar 100 or 100' is moved downward into the arrow direction, according to FIG. 19, runs onto the clamping element 19 and moves the latter in the direction of the clamping surface 22, with clamping fast of the belt band 4.

Figure 21:
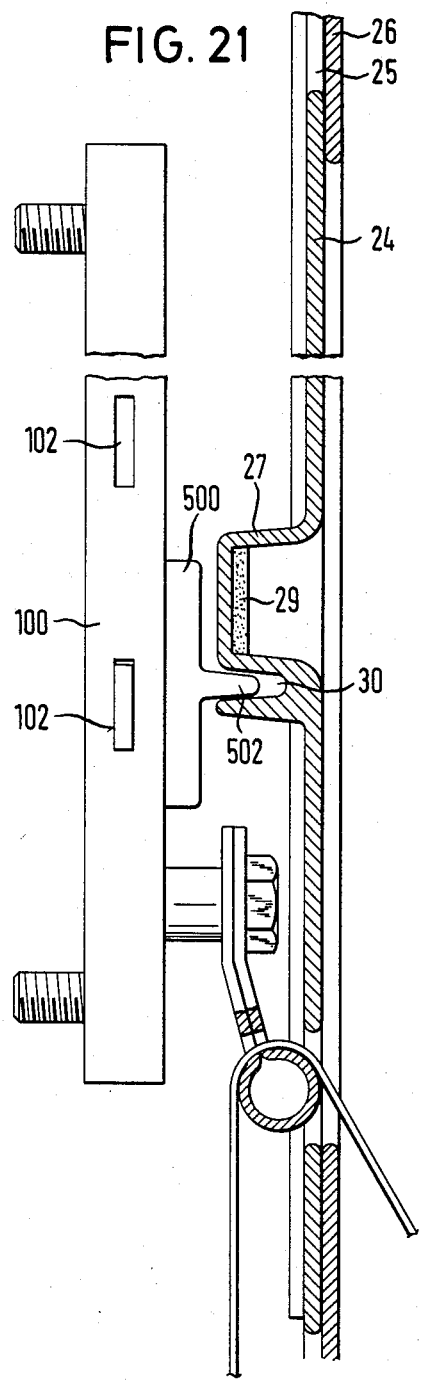
FIGS. 21 and 22 shows the connection of the fitting according to the preceding figures with an improving covering, in side sectional view and in perspective.
Figure 22:
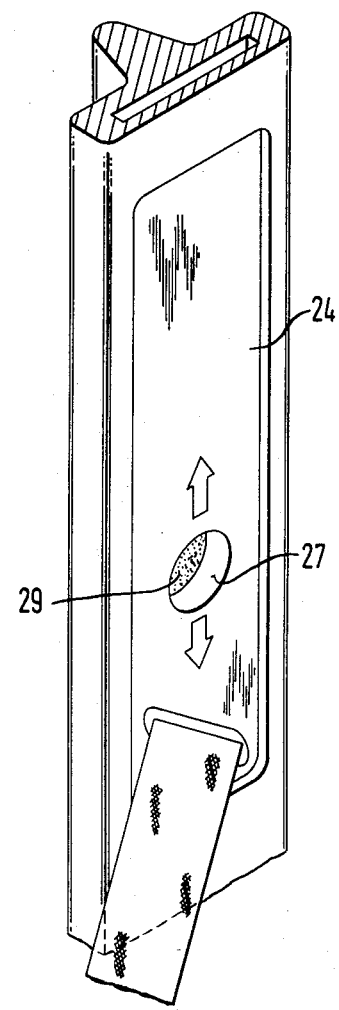

In FIGS. 21 and 22 is illustrated an advantageous design of handle and slide, in connection with a fitting of the kind described above. The fitting consists, again, of a guide bar 100, fastened to the vehicle, with catch openings 102, with a fitting part, not shown, and a slide 500, movable in relation to this fitting part, with handle 502. In such safety belt devices it is often wished that the functioning parts be arranged behind the post covering the motor vehicle. In this example of execution, the fitting described above, with guide bar 100 and slide 500, is arranged behind a slide covering or panel 24, this slide covering 24 being conducted movable in a guide groove of the post covering or housing 26 of the vehicle. The slide covering has a deepened gripping hollow 27, at the bottom of which is arranged an elastic coating, for example, a foam rubber coating 29, to avoid injuring the fingernails. The gripping hollow 27 has a carrier groove 30, which is in coupling engagement with the handle 502 of the slide 500. By pushing the slide covering 502 in the desired direction of movement, according to the arrows placed on the slide covering, the slide is pushed along and the fitting illustrated is adjusted in height as desired.

I claim:

1. An adjustable safety belt anchorage comprising a guiding rail adapted to be mounted in a motor vehicle, a carriage longitudinally slidable in first and second directions along said guiding rail, said guiding rail having longitudinally spaced locking openings, a locking member movably mounted on said carriage for selective engagement with said spaced locking openings, said carriage having support means for the safety belt, an actuator member movable relative to said carriage for a limited distance in the first and second directions, means for converting relative movement between said actuator member and said carriage in a selected one of the first and second directions into movement of said locking member away from one of said locking openings, and means interconnecting said actuator member and carriage for moving said carriage along said guiding rail in the selected one of the first and second directions in response to continued movement of said actuator member in the selected one of the first and second directions.

2. An adjustable safety belt anchorage according to claim 1, wherein said support means for the safety belt includes a fitting peg fastened to said carriage and a safety belt turning element connected to said fitting peg.

3. An adjustable safety belt anchorage according to claim 1 wherein said locking member is movable in opposite directions and said carriage includes support elements which guide said locking member.

4. An adjustable safety belt anchorage according to claim 3 further including a spring supported on the carriage for pressing said locking member into the locking openings.

5. An apparatus for use in adjusting a safety belt, said apparatus comprising a guide track, a carriage movable in first and second directions along said guide track, connector means connected with said carriage for connecting the safety belt with said carriage, lock means disposed on said carriage and operable between an engaged condition preventing movement of said carrige along said guide track and a release condition in which said lock means is ineffective to prevent movement of said carriage along said guide track, an actuator member manually movable in the first and second directions along said guide track, and operator means for operating said lock means from the engaged condition in response to movement of said actuator member in the first direction along said guide track and for operating said lock means from the engaged condition in response to movement of said actuator member in the second direction along said guide track.

6. An apparatus as set forth in claim 5 further including force transmitting means for transmitting force from said actuator member to said carriage to move said carriage along said guide track in the first direction with said lock means in the release condition and for transmitting force from said actuator member to said carriage to move said carriage along said guide track in the second direction with said lock means in the release condition.

7. An apparatus as set forth in claim 5 wherein said lock means includes a movable lock member disposed on said carriage, said operator means includes means for moving said lock member in the same direction relative to said carriage in response to movement of said actuator member in either the first direction or the second direction along said guide track.

8. An apparatus as set forth in claim 5 wherein said operator means includes a rotatable force transmitting member mounted on said carriage and connected with said lock member, means for rotating said force transmitting member in the same direction relative to said carriage in response to movement of said actuator member in either the first or the second direction along said guide track, and means for operating said lock means from the engaged condition in response to rotation of said force transmitting member.

9. An apparatus as set forth in claim 5 wherein said operator means includes first surface means movable with said actuator member relative to said carriage in the first direction to operate said lock means from the engaged condition and second surface means movable with said actuator member relative to said carriage in the second direction to operate said lock means from the engaged condition.

10. An apparatus as set forth in claim 5 wherein said lock means includes a movable lock member disposed on said carriage, said operator means includes a cam follower connected with said lock member and first and second cam surfaces connected with said actuator member, said actuator member being movable relative to said lock member in the first direction along said guide track to apply force against said cam follower with said first cam surface to operate said lock means from the engaged condition, said actuator member being movable relative to said lock member in the second direction along said guide track to apply force against said cam follower with said second cam surface to operate said lock means from the engaged condition.

11. An apparatus as set forth in claim 10 further including first surface means movable with said actuator member in the first direction for applying force to said cam follower to move said carriage and lock member in the first direction along said guide track when said lock means is in the release condition, and second suface means movable with said actuator member in the second direction for applying force to said cam follower to move said carriage and lock member in the second direction along said guide track when said lock means is in the release condition.

12. An apparatus as set forth in claim 5 further including a first surface connected with said carriage and a second surface connected with said actuator member, said first and second surfaces being movable into abutting engagement by movement of said actuator member along said guide track in said first direction to transmit force from said actuator member to said carriage to move said carriage along said guide track in said first direction.

13. An apparatus as set forth in claim 5 wherein said operator means includes a cam surface which is movable relative to said guide track with said actuating member and a cam follower disposed in engagement with said cam surface and connected to said lock means, said cam surface being effective to apply force to said cam follower during only a portion of the operation of said lock means from the engaged condition to the release condition, said lock means including surface means for engaging said guide track to apply force against said lock means to operate said lock means to the disengaged condition.

14. An apparatus as set forth in claim 5 further including track means for guiding movement of said guide track, and clamp means for clamping a portion of the safety belt in response to movement of said guide track relative to said track means.

15. An apparatus as set forth in claim 14 wherein said clamp means includes a rotatably mounted eccentric and a clamp surface which cooperate to at least partially define a space through which the safety belt extends, said guide track being connected with said eccentric and movable relative to said track means to rotate said eccentric and clamp a portion of the safety belt between said eccentric and said clamp surface.

16. An apparatus as set forth in claim 5 further including housing means for at least partially enclosing said guide track and actuator member, said housing means including a slidable panel which is connected with and blocks access to said actuator member, said panel being manually movable to move said actuator member along said guide track.

17. An apparatus as set forth in claim 5 wherein said lock means includes first and second lock members which are disposed on said carriage, said operator means including meand for moving said first lock member relative to said carriage in response to movement of said actuator member in said first direction along said guide track and means for moving said lock member relative to said carraige in response to movement of said actuator member in said second direction along said guide track.

18. An apparatus as set forth in claim 17 wherein said first lock member has surface means for engaging said guide track and moving said first lock member relative to said carriage in response to movement of said actuator member in said second direction, said second lock member having surface means for engaging said guide track and moving said second lock member relative to said carriage in response to movement of said actuator member in said first direction.

19. An apparatus as set forth in claim 5 wherein said means for rotating said force transmitting member includes first surface means connected with said actuator member for applying force to said force transmitting member to move said carriage with said force transmitting member in the first direction along said guide track when said lock means is in the release condition and second surface means connected with said actuator member for applying force to said force transmitting member to move said carriage with said force transmitting member in the second direction along said guide track when said lock means is in the release condition.

* * * * *